United States Patent [19]

Bexten

[11] Patent Number: 5,522,280

[45] Date of Patent: Jun. 4, 1996

[54] CONNECTING LINKS FOR WINDSHIELD WIPERS AND METHOD FOR FABRICATING THE LINK

[75] Inventor: Daniel P. Bexten, Columbus, Miss.

[73] Assignee: United Technologies Motor Systems, Inc., Dearborn, Mich.

[21] Appl. No.: 173,182

[22] Filed: Dec. 23, 1993

[51] Int. Cl.$^6$ .................................................. G05G 1/06
[52] U.S. Cl. ........................... 74/579 R; 74/587; 74/588; 403/282; 29/417; 29/516; 29/517; 15/250.3
[58] Field of Search ......................... 74/586, 587, 579 R, 74/522, 596, 600, 597, 588; 403/274, 279, 282, 276; 29/417, 515, 516, 517; 15/250.3, 250.27, 250.13

[56] References Cited

U.S. PATENT DOCUMENTS

| | | | |
|---|---|---|---|
| 1,823,158 | 9/1931 | Mogford et al. | 403/274 |
| 1,947,278 | 2/1934 | Schaefer | 74/579 |
| 2,445,428 | 7/1948 | Goldberg | 29/517 |
| 2,752,214 | 6/1956 | Ferris | 74/579 |
| 2,780,825 | 2/1957 | Kofczynski | 15/250.27 |
| 3,016,766 | 1/1962 | Hoyler | 15/250.30 |
| 4,097,163 | 6/1978 | Dubuque | 403/274 |
| 4,686,733 | 8/1987 | Sahara | 74/600 |
| 5,005,249 | 4/1991 | Nishizawa et al. | 15/250.27 |
| 5,121,808 | 6/1992 | Visentini et al. | 74/586 |

FOREIGN PATENT DOCUMENTS

| | | |
|---|---|---|
| 0517436 | 12/1992 | European Pat. Off. . |
| 0579552 | 1/1994 | European Pat. Off. . |
| 1445670 | 6/1966 | France . |
| 2240148 | 2/1973 | Germany . |
| 3911925 | 10/1990 | Germany . |
| 61-163048 | 12/1986 | Japan . |

OTHER PUBLICATIONS

Exhibit 1 Photograph of Prior Art Windshield Wiper Connecting Link, Date Unknown.
Exhibit 2 Photograph of Prior Art Windshield Wiper Connecting Link, Date Unknown.
Exhibit 3 Photograph of Prior Art Windshield Wiper Connecting Link, Date Unknown.
Exhibit 4 Photograph of Prior Art Windshield Wiper Connecting Link, Date Unknown.
Exhibit 5 Photograph of Prior Art Windshield Wiper Connecting Link, Date Unknown.
Exhibit 6 Photograph of Prior Art Windshield Wiper Connecting Link, Date Unknown.
Exhibit 7 Photograph of Prior Art Windshield Wiper Connecting Link, Date Unknown.
Exhibit 8 Photograph of Prior Art Windshield Wiper Connecting Link, Date Unknown.
Exhibit 9 Photograph of Prior Art Windshield Wiper Connecting Link, Date Unknown.
Holmes, Michael Barry, "Link for Windscreen Wiper Mechanism," *2244 Research Disclosure*, Emsworth, Great Britain, pp. 803–804, Oct. (1992).

Primary Examiner—Richard M. Lorence
Assistant Examiner—David Fenstermacher
Attorney, Agent, or Firm—Harness, Dickey & Pierce

[57] ABSTRACT

The connecting link is manufactured from an elongated hollow extrusion of aluminum, which can be cut to any desired length and bent, as required. Molded plastic coupling members have tongues which are inserted into the open ends of the hollow extrusion and crimped in place to hold them securely. The coupling members have integrally formed socket structures to receive complementary ball structures which form the pivot connections of the wiper system.

10 Claims, 4 Drawing Sheets

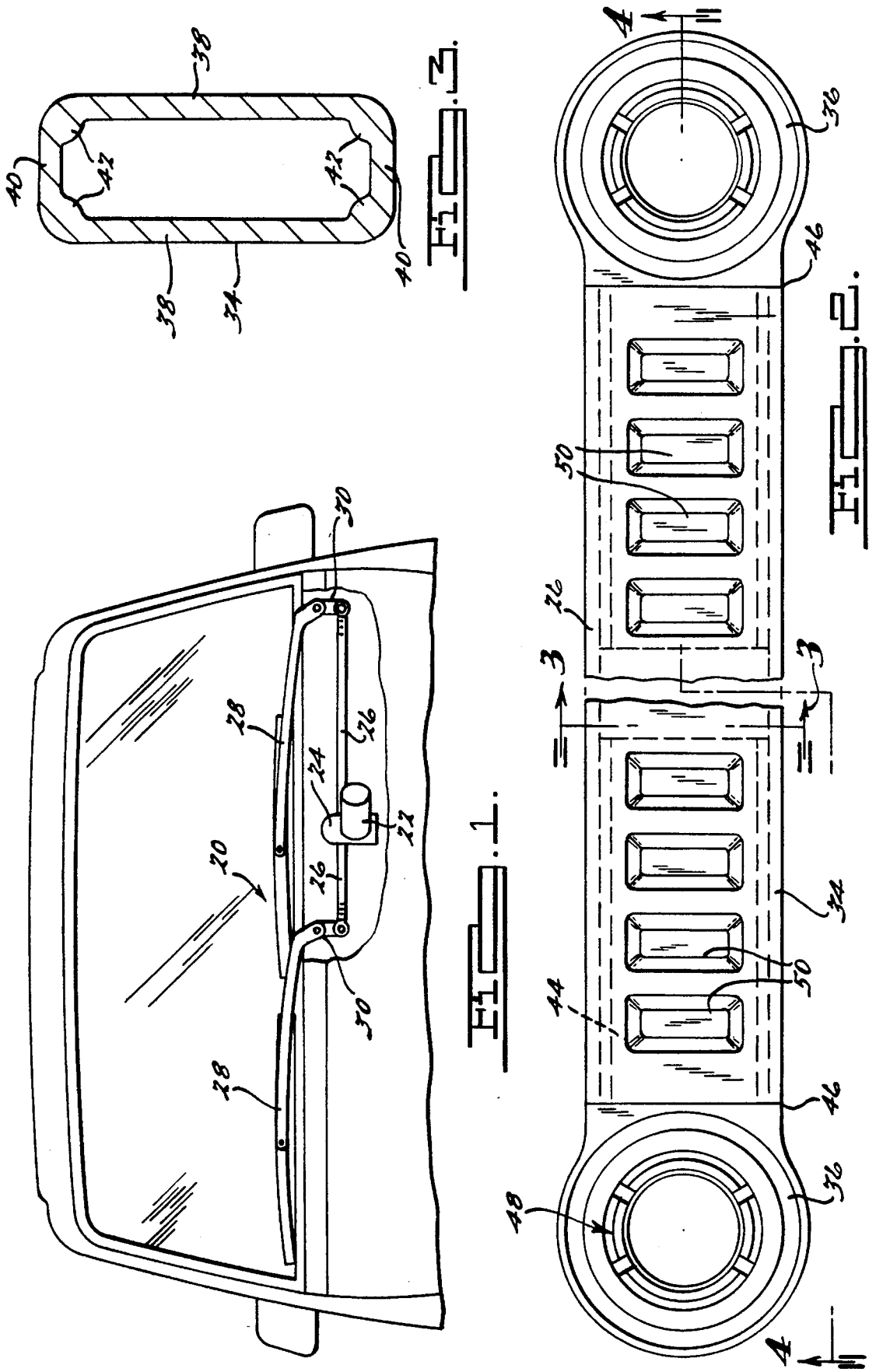

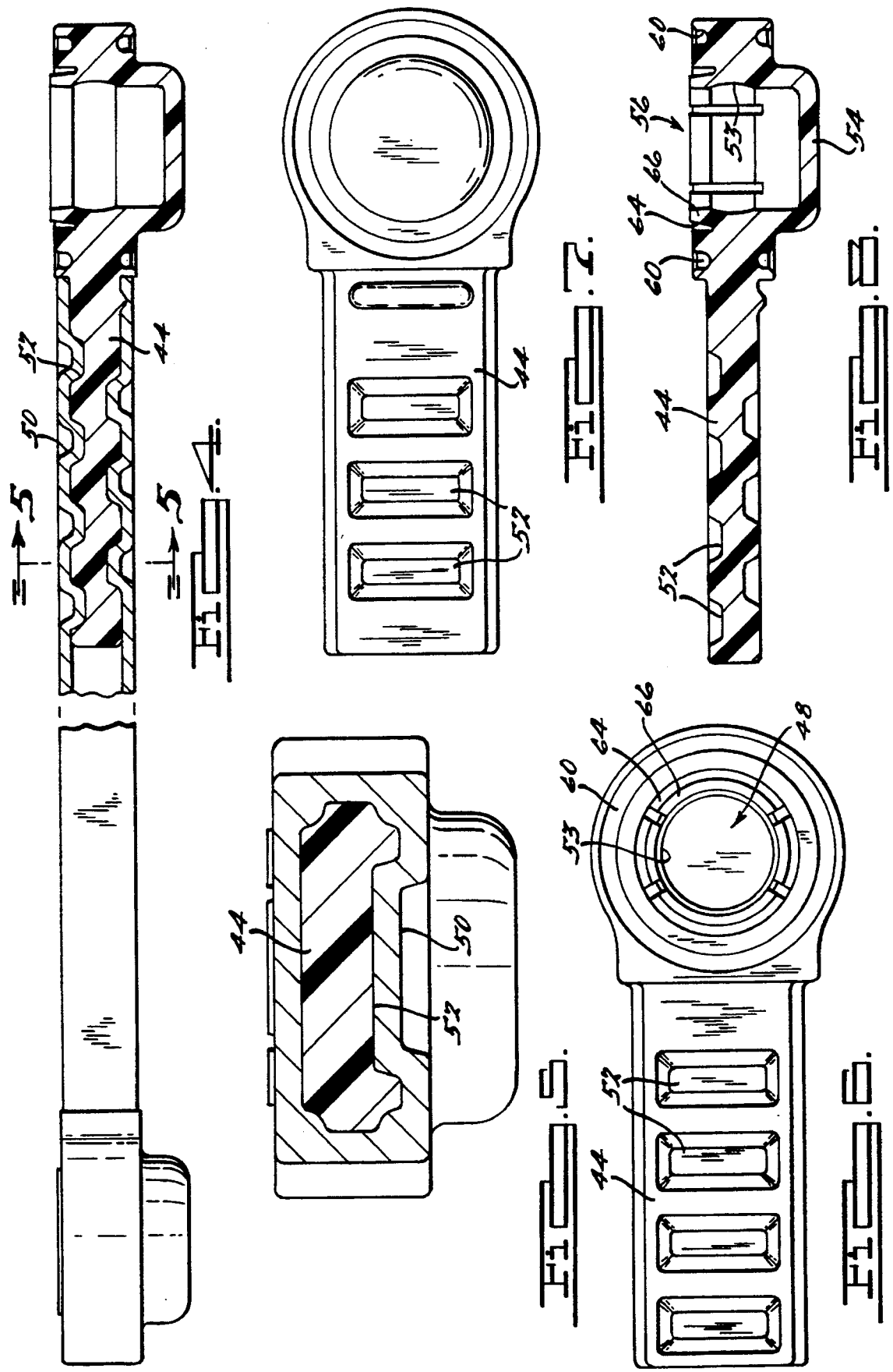

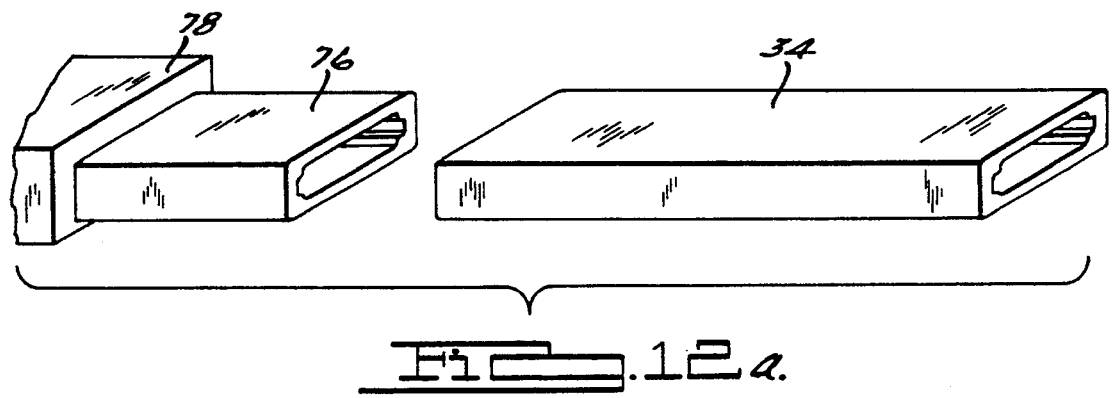
FIG. 12a.
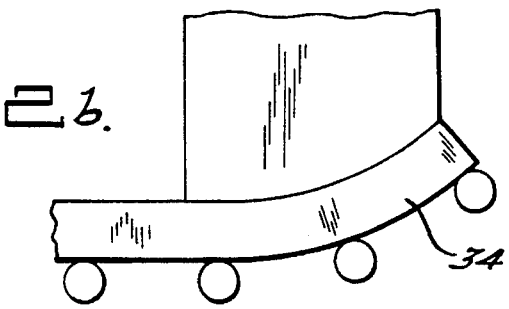
FIG. 12b.
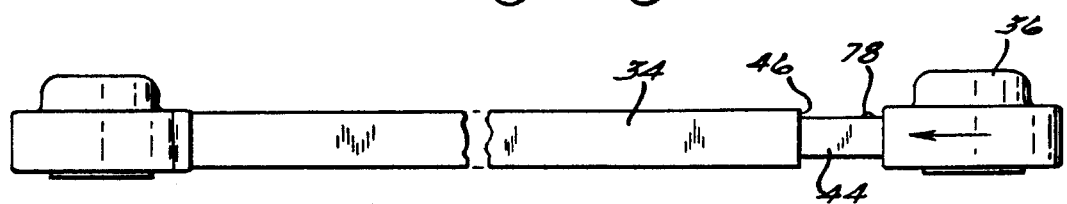
FIG. 12c.
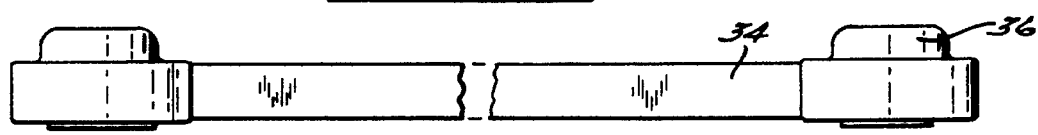
FIG. 12d.
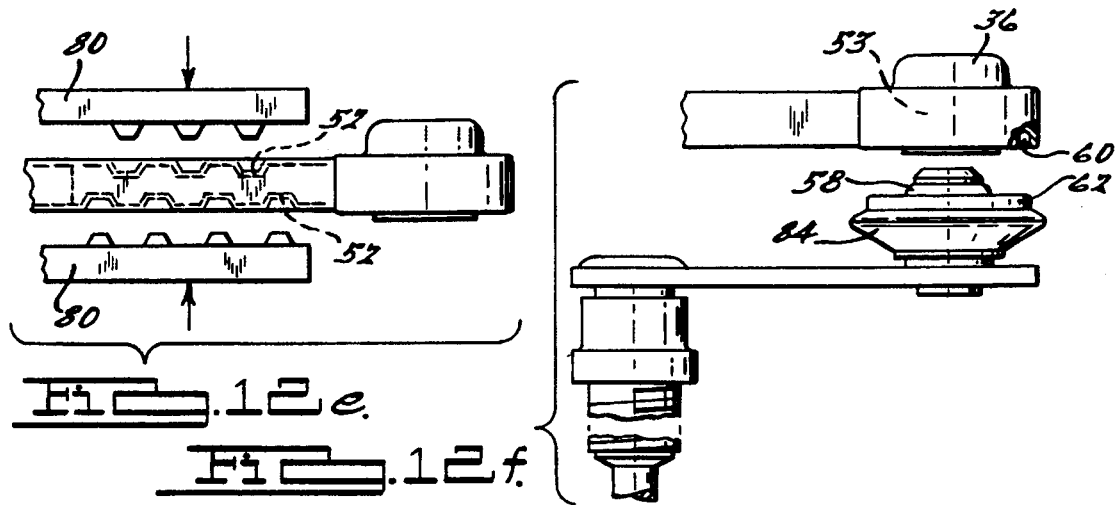
FIG. 12e.
FIG. 12f.

CONNECTING LINKS FOR WINDSHIELD WIPERS AND METHOD FOR FABRICATING THE LINK

BACKGROUND AND SUMMARY OF THE INVENTION

The present invention relates generally to linkage systems. More particularly, the invention relates to a linkage system for the windshield wiper which is strong, lightweight and readily adaptable to a variety of different windshield wiper configurations.

The automotive windshield wiper system typically consists of an actuator motor (either electric, air or hydraulic) coupled through suitable linkage to a pivot assembly which in turn drives the wiper arms and blades. Conventionally, the actuator motor is disposed in a suitable location usually in the engine compartment near the windshield. The pivot assemblies are likewise disposed adjacent the lower edge of the windshield and transmit motion of the motor to the wiper arms. The desired wipe angle and the cleaning area on the windshield are obtained by properly selecting the length and configuration of the linkage and of the wiper arms attached to the shaft of the pivot assembly. In most applications two arms and blades are actuated by a single motor through the use of two or more connecting links. These connecting links are therefore an important component of most windshield wiper systems.

There are numerous different automotive body styles and correspondingly numerous different windshield wiper systems and configurations. Conventionally, the windshield wiper linkage has consisted of one or more links made of flat stamped steel members or steel conduit tubing. To accommodate the variation in sizes and geometries of different wiper systems it has often been necessary to re-engineer and retool the linkage with each wipe system design change. Thus, traditionally, there has been very little opportunity for standardization of the linkage components. The lack of standardization adds to the overall cost of the vehicle, since the tooling, manufacturing and inventory costs are all increased by the need to maintain all of these different configurations and designs.

Aside from the higher cost, conventional steel links are heavy and tend to degrade the performance and longevity of the wiper system. This can be better understood when one considers that a typical wiper changes directions as much as 130 times per minute. Inertia is therefore a factor. Acceleration and deceleration forces exert loads on the wiper linkage, especially at the connecting points, and these loads add to the loads required to move the arms and blades back and forth across the windshield. Moreover, each time the direction of motion changes there are forces transmitted back to the motor which result in back and forth thrusting forces being applied to the motor armature. This can become a source of noise and wear as the armature bounces against the thrusting surface.

Therefore, it would be desirable to reduce the weight of the linkage as much as possible, since this would lower the inertia, reduce the load placed on the actuator motor and minimize noise and wear.

While reduction of weight is desirable for the reasons set forth above, simply making the linkage thinner is not desirable, since strength would be sacrificed. Strength is quite important, since the wiper system must function not only on rainy days, but also on snowy and icy days. On snowy and icy days considerably greater strength is required since the wipers are used to move heavy amounts of snow or to break the wiper blades free of an icing condition.

The present invention provides a fresh approach to the design and manufacture of windshield wiper linkage which results in a linkage that is considerably lighter than conventional linkage and with the strength equivalent to or better than conventional linkage. The linkage employs an elongated hollow extrusion of aluminum or other suitable lightweight material which is open at at least one end to receive a coupling member which has a tongue portion disposed in the open end of the extruded member. The coupling member defines a pivot-forming structure for connection to the pivot linkage of the wiper.

In the presently preferred embodiment the extruded member is fabricated from aluminum and is formed with radius interior corners to provide extra strength. The coupling member of the presently preferred embodiment is an injection molded plastic material which is readily and economically manufactured and which is exhibits good pivot wear characteristics. The presently preferred pivot structure is a ball and socket arrangement.

The present invention also provides a method of manufacturing the wiper linkage whereby an elongated member is extruded and cut to suitable length leaving at least one open end. A coupling member, preferably of molded plastic, is formed and inserted into the open end of the elongated member. The coupling member is formed with a tongue which is inserted into the open end of the elongated member. The elongated member is then crimped or otherwise suitably formed to form a mechanical engagement with the tongue. This secures the coupling member to the elongated member. The coupling member can be formed to include a pivot-forming socket and the linkage is then suitably secured to the pivot assembly of the wiper by snap-fit engagement of the pivot assembly ball into the pivot-forming socket.

For a more complete understanding of the invention, its objects and advantages, reference may be had to the following specification and to the accompanying drawings.

BRIEF DESCRIPTION OF THE DRAWINGS

FIG. 1 is a cut away view of an automobile showing the configuration and placement of the windshield wiper components;

FIG. 2 is a plan view of the connecting link in accordance with the invention;

FIG. 3 is a medial sectional view of the connecting link of FIG. 2, taken substantially along the line 3—3 of FIG. 2;

FIG. 4 is a partial elevation and partial longitudinal cross-sectional view of the link of FIG. 2, taken substantially along the line 4—4 in FIG. 2;

FIG. 5 is a cross-sectional view taken along the line 5—5 in FIG. 4, illustrating the interfitting tongue and channel configuration of the preferred embodiment;

FIG. 6 is an elevational view of a first embodiment of coupling member in accordance with the invention;

FIG. 7 is an underside elevational view of the embodiment of FIG. 6;

FIG. 8 is a longitudinal cross-sectional view of the coupling of FIGS. 6 and 7;

FIGS. 12A–12F are a series of drawings illustrating the method for fabricating the connecting link in accordance with the invention.

DESCRIPTION OF THE PREFERRED EMBODIMENTS

Figure 9:
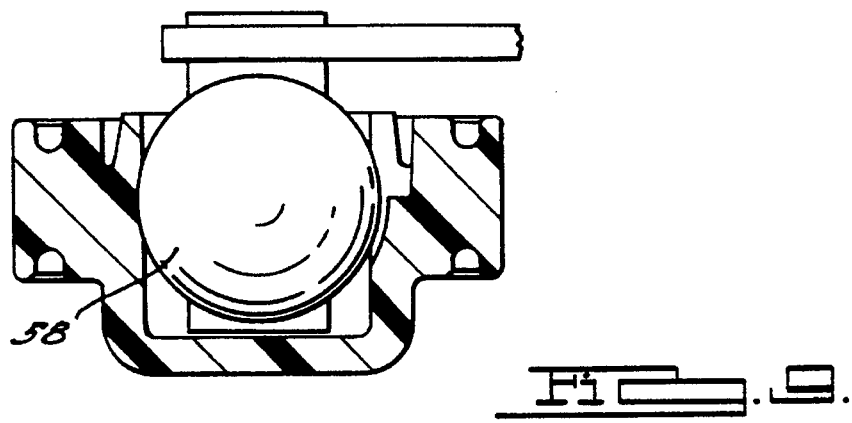
FIG. 9 is a cross-sectional view of the coupling of FIGS. 6–8, taken through the pivot-forming socket structure.

The connecting link of the present invention is adapted for connecting the pivot linkage of a windshield wiper to the associated actuator motor. Accordingly, in FIG. 1 an exemplary windshield wiper system is illustrated generally at 20. The system includes an actuator motor 22, which may be any suitable motor such as electric, air or hydraulic. Attached to motor 22 is a suitable crank linkage 24 for converting rotary motion of the motor into reciprocating motion. The crank linkage is in turn connected to the connecting links 26, which are manufactured and configured in accordance with the present invention. In the embodiment of FIG. 1 two connecting links have been illustrated, one for each of the two windshield wipers 28. Connecting links 26 are coupled at their opposite ends to the pivot linkage 30. If desired, intermediate linkage may be employed to suitably alter the motion of the wiper, according to the particular wiper system design. Such intermediate linkage may be fabricated according to the principles of the invention. Also, if desired, the connecting links 26 may be bent or angled to accommodate the particular wiper system design.

To illustrate the principles of the connecting link and its method of fabrication, refer to FIG. 2. In FIG. 2 a single connecting link 26 has been illustrated. The link comprises an elongated hollow extruded member 34 and at least one coupling member 36. In FIG. 2 two coupling members 36 are illustrated.

The elongated hollow extruded member is preferably fabricated by extruding aluminum into hollow stock of generally rectangular cross-section as illustrated in FIG. 3. In FIG. 3, the extruded member 34 has a pair of oppositely disposed long sidewalls 38 and a pair of oppositely disposed short sidewalls 40. The sidewalls meet to form corners which are increased in thickness as by being radiused, as at 42. By forming radiuses at the interior corners the corners are made thicker than the average thickness of the sidewalls 38 and 40. This results in a strong extruded member which can be curved or bent to accommodate the particular wiper system design.

Coupling member 36 is preferably fabricated by injection molding a plastic material or thermoplastic material such as acetal resin. The presently preferred acetal resin is known by the trade designation DERLIN 507, available from dupont Corporation.

The coupling member is formed to include a tongue portion 44, which is adapted to slidably fit into the open end 46 of the extruded member 34. The coupling member is also formed to define a pivot-forming structure 48, which is adapted to receive the pivot linkage 30. The presently preferred embodiment is designed to work with a pivot linkage of the ball and socket variety. The pivot linkage is provided with a ball structure (seen in FIG. 9) and the pivot forming structure 48 of coupling member 36 is fabricated to receive this ball by snap fit.

Coupling member 36 is secured to the hollow extruded member by a suitable procedure such as by crimping. This may be seen in FIG. 4 generally at 50.

Figure 10:
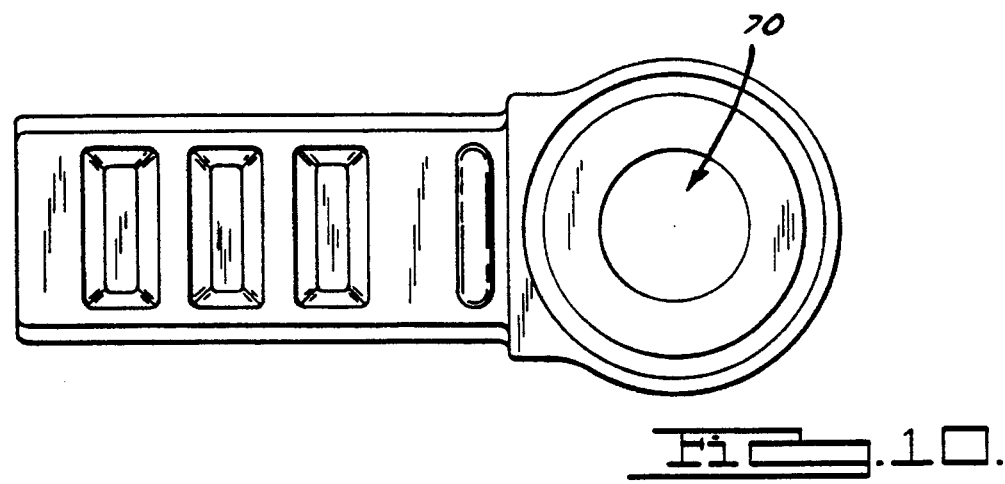
FIG. 10 is an elevational view of the underside of another embodiment of coupling member.
Figure 11:
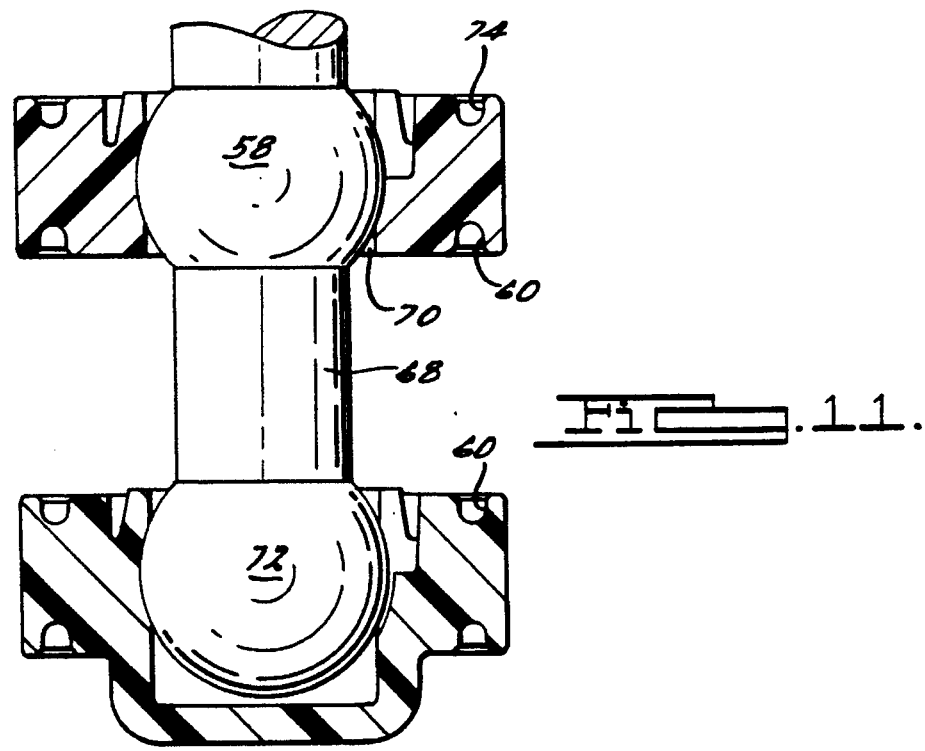
FIG. 11 is a cross-sectional view of the coupling members of FIGS. 9 and 10, taken through the pivot-forming socket structure.

The connecting link of the invention may utilize various different coupling member configurations. There are two presently preferred forms, a closed socket form and an open socket form. The closed socket form was depicted in FIGS. 2 and 4 and is fully illustrated in FIGS. 6–9. The open socket form is fully illustrated in FIGS. 10 and 11.

Referring to FIGS. 6–9 it will be seen that the tongue portion 44 is preformed with a series of indentations 52 which are designed to mate with the walls of the extruded member at the crimped region adjacent the open end of the extruded member.

As illustrated in FIGS. 6–9, the pivot-forming structure 48 defines a socket 53, which may be closed at one end by wall 54 and open at the other end 56 to receive the ball structure 58 (FIG. 9) of the pivot linkage 30 or of the crank linkage 24. The pivot-forming structure may be provided with an annular groove 60 designed to receive the rim 62 (FIG. 12F) of a flexible rubber boot used to prevent dirt and other contaminants from entering the socket 53. Preferably socket 53 is designed to receive ball 58 in a snap fit fashion. Thus the pivot-forming structure 48 is provided with a second annular groove 64, of a generally V-shaped cross-section, which allows the sidewalls 66 at open end 56 to flex radially outwardly as ball 58 is inserted and then snap back to retain the ball in the socket.

In many applications, where the connecting link needs to connect to only one pivot structure at each end, the embodiment of FIGS. 6–9 is preferred, since the socket 53 is closed by wall 54 and thus requires only one boot in order to seal the ball and socket and prevent dirt and contamination from entering. Some applications, however, dictate that the connecting link accommodate a plurality of pivot connections at a given end. In this case, the crank linkage may be provided with a shaft having two ball-like structures, one for each of the two connecting links 26 (see FIG. 11). Such an application may utilize a connecting link of the type illustrated in FIGS. 10 and 11, in which the wall 54 is eliminated and the socket is open. With the socket open, the ball 58 can be provided with an extension shaft 68 which passes through opening 70, to allow a second ball structure 72 to be attached. In this embodiment, two rubber boots might be employed to seal the socket and these may be press fit into annular groove 60 and annular groove 74.

The method of fabricating the connecting link in accordance with the invention is illustrated in FIGS. 12A–12F. In FIG. 12A an elongated hollow stock 76 is extruded and cut to length to form the elongated hollow extruded member 34. A suitable extrusion die 78 has been illustration in FIG. 12A. Next, as illustrated in FIG. 12B, the hollow extruded member 34 can be bent using suitable dies or roll forming equipment, or the like.

Next, the coupling members are installed by sliding the tongue portion 44 into the open end 46 of the extruded member 34. The presently preferred embodiment includes a protrusion 78 on the tongue portion which is designed to engage the interior of the extruded member, to hold the tongue portion in place during the following manufacturing steps. Installation of the coupling members in this fashion has been illustrated in FIGS. 12C and 12D.

After the coupling members are installed and held in place by means of the protrusion 78, a crimping die 80 is applied as illustrated in FIG. 12E. Preferably, the die is positioned to register with the indentations 52 which were formed in the coupling member. Thus, when the crimping action is performed, the metal sidewalls of the extruded member conform to and lock with the indentations of the coupling member. This prevents the coupling member from being separated from or pulled out of the extruded member. Next, as illustrated in FIG. 12F, the ball 58 of the linkage structure is press fit into the socket 53 of coupling member 36. In addition, the annular edge 62 of boot 84 is inserted into the annular groove 60 to form a seal. While the series of FIGS. 12A–12F have illustrated the fabrication at one end of the connecting link, it will be understood that the same procedure may be followed to form the opposite end.

From the foregoing, it will be seen that the present invention provides an economical, lightweight and strong connecting link to replace conventional stamped steel and tubular steel links in windshield wiper systems. The method of manufacturing or fabricating the connecting link lends itself well to mass production operations and particularly operations where standardization is desirable.

While the invention has been illustrated and described in its presently preferred embodiments, it will be understood that the present invention is capable of certain modification without departing from the spirit of the invention as set forth in appended claims.

What is claimed is:

1. A connecting link for connecting to a pivot linkage of a windshield wiper, comprising:

a metallic elongated hollow extruded member of generally rectangular cross-section having at least one open end which is selectively crimpable and four walls having an average predetermined thickness, said four walls meet to form radiused inner corners having a thickness greater than said average predetermined thickness of said four walls;

at least one coupling member made of a plastic material having an integral tongue portion disposed in said at least one open end of said elongated hollow extruded member, said tongue portion having a generally rectangular cross-section including two opposed side surfaces having a series of indentations for receiving crimped portions of said elongated hollow extruded member, said indentations on one of said two side surfaces being offset with respect to the indentations on a second of said two side surfaces;

said at least one coupling member defining a pivot-forming structure for connection to the pivot linkage;

wherein said elongated hollow extruded member is crimped at a plurality of locations on each of a first and a second of said four walls at locations corresponding to said indentations on each of said two side surfaces of said at least one coupling member.

2. The connecting link of claim 1 wherein said coupling member is made of a thermoplastic material.

3. The connecting link of claim 1 wherein said coupling member is made of an acetal resin material.

4. The connecting link of claim 1 wherein said pivot-forming structure comprises a socket structure for receiving a ball.

5. The connecting link of claim 1, wherein said pivot-forming structure comprises a socket structure formed to snap-fit onto a ball associated with said pivot linkage.

6. A method of fabricating a connecting link for connecting to a pivot linkage of a windshield wiper, comprising:

extruding an elongated hollow metallic stock of generally rectangular cross-section having four sidewalls of a predetermined average thickness which meet to define radiused inner corners of a thickness greater than said average thickness of said sidewalls;

cutting said stock to a predetermined length to define an elongated hollow member having at least one open end which is selectively crimpable;

forming at least one coupling member of a plastic material, said at least one coupling member being formed to include an integral tongue portion and a pivot-forming structure adapted for connection to said pivot linkage, said tongue portion including two opposed sidewalls having a series of indentations for receiving crimped portions of said elongated hollow member, said indentations on one of said two sidewalls being offset with respect to the indentations on a second of said two sidewalls;

inserting said tongue portion into said at least one open end of said elongated hollow member; and crimping said elongated hollow member at a plurality of locations along a first and a second wall of said four walls at locations corresponding to said indentations on each of said two walls of said at least one coupling member.

7. The method of claim 6 wherein said coupling member forming step is performed by injection molding.

8. The method of claim 6 wherein said coupling member is formed with a protrusion on said tongue portion and further comprising causing said protrusion to engage the interior of said elongated hollow member to hold said tongue portion in said open end of said hollow member prior to said securing step.

9. The method of claim 6 wherein said coupling member forming step further comprises forming said pivot-forming structure by forming a socket structure to receive a ball structure.

10. The method of claim 6 wherein said coupling member forming step further comprises forming said pivot-forming structure by forming a socket structure and further comprising providing said pivot linkage with a ball structure and snap-fitting said ball structure into said socket structure to connect said connecting link to said pivot linkage.

* * * * *